May 11, 1965     A. G. V. GUSTAFSSON     3,183,016
SUSPENSION DEVICE FOR THE CHASSIS OF A VEHICLE
Filed Sept. 9, 1964     3 Sheets-Sheet 1

INVENTOR.
AXEL GERHARD VÄRNE GUSTAFSSON
BY Hane and Nydick
ATTORNEYS

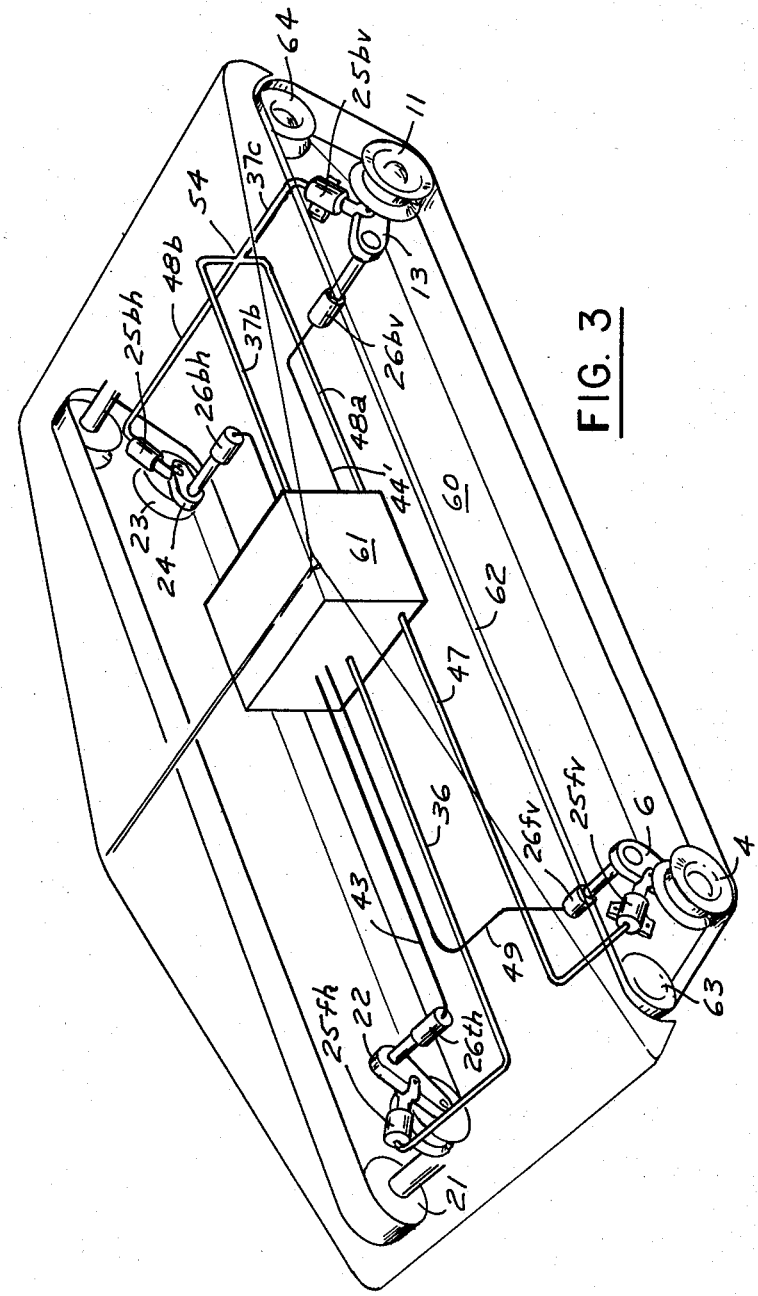

May 11, 1965     A. G. V. GUSTAFSSON     3,183,016
SUSPENSION DEVICE FOR THE CHASSIS OF A VEHICLE
Filed Sept. 9, 1964     3 Sheets-Sheet 3

INVENTOR.
AXEL GERHARD VÄRNE GUSTAFSSON
BY
ATTORNEYS

United States Patent Office 3,183,016
Patented May 11, 1965

3,183,016
SUSPENSION DEVICE FOR THE CHASSIS
OF A VEHICLE
Axel Gerhard Värne Gustafsson, Karlskoga, Sweden, assignor to Aktiebolaget Bofors, Bofors, Sweden, a corporation of Sweden
Filed Sept. 9, 1964, Ser. No. 395,148
3 Claims. (Cl. 280—6.1)

The present invention relates to a suspension device for a chassis having at least four wheels suspended therefrom and tiltably mounted in a vertical plane so that the distance between the chassis and the wheels varies in accordance with the positions of tilt of the wheels in reference to the chassis. The wheels may run directly on the ground or may be used as drive and guide wheels for the tracks of a track-laying vehicle.

Chassis of the general kind here referred to are used for tractors, earth-moving machines, mobile weapon carriers, armored tanks, etc. Chassis used for such purposes frequently must travel on rough ground, and accordingly, the problem arises of maintaining the chassis in a substantially level position with respect to any unevenness of the ground.

The present application is a continuation-in-part of my co-pending application Serial No. 154,213 filed November 22, 1961, issued as Patent No. 3,154,317 on October 27, 1964.

It is an object of the invention to provide a novel and improved chassis suspension device of the general kind above referred to which automatically maintains the chassis in a substantially level position if the chassis is traveling along uneven ground.

It is also an object of the invention to provide a novel and improved chassis suspension device which permits setting of the chassis for a selected position of height and/or inclination in reference to the ground.

More specifically, the invention resides in a chassis suspension device in which the position of tilt of the wheels are controlled by a hydraulically operated servo-mechanism in a manner such that upon a change in the tilt of one wheel due to uneven ground, the diagonally opposite wheel is correspondingly displaced and that the two other diagonally opposite wheels are also correspondingly displaced but in the opposite direction, whereby the displacements of both pairs of wheels are so correlated that the chassis is automatically restored to its level position. The invention also provides control means for manually controlling the servomechanism so that the chassis is placed in a level position at a selected height or in a selected lengthwise slanted position in reference to the ground, irrespective of whether the ground on which the chassis rests is even or uneven.

Other and further objects, features and advantages of the invention will be pointed out hereinafter and set forth in the appended claims constituting part of the application.

In the accompanying drawing a preferred embodiment of the invention is shown by way of illustration, and not by way of limitation.

In the drawing:

FIG. 3 is a diagrammatic perspective view of the vehicle and the chassis suspension device thereof;

Figure 1:
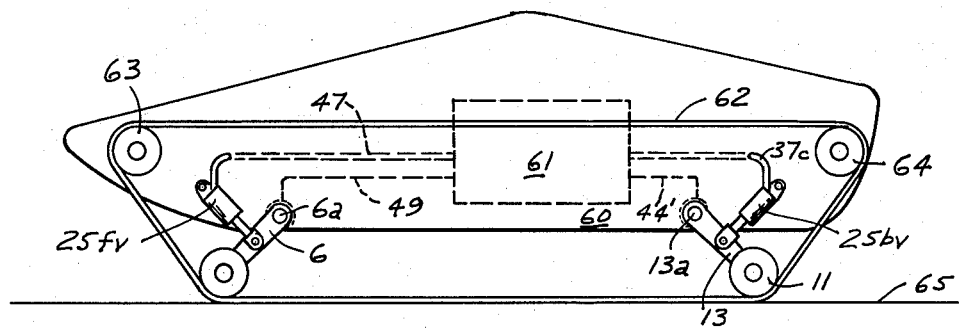
FIG. 1 is a diagrammatic view of a track-laying vehicle equipped with a chassis suspension device according to the invention.
Figure 2:
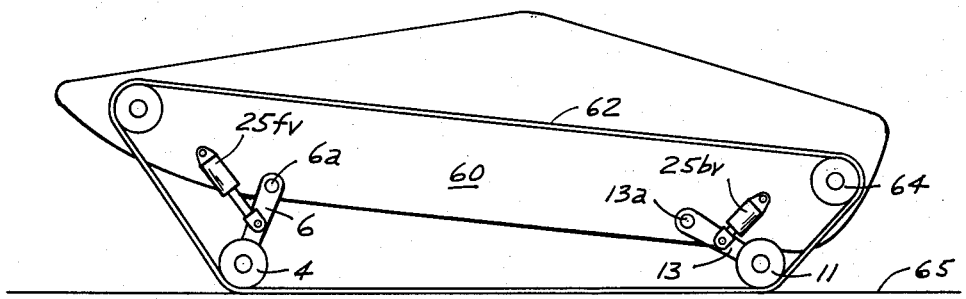
FIG. 2 is a diagrammatic view similar to FIG. 1, but showing the vehicle at a different angle of elevation in reference to the ground.

Referring now to the figures in detail, FIGS. 1, 2 and 3 show diagrammatically a chassis 60 on which is mounted an electro-hydraulic servomechanism 61. The chassis is supported by at least two pairs of wheels. There are shown two front wheels 4 and 21 and two rear wheels 11 and 23. The front wheels are suspended on the chassis by levers or arms 6 and 22 pivotal about pivot points 6a and 22a, respectively, on the chassis. Rear wheels 11 and 23 are similarly supported by levers or arms 13 and 24 pivotal about pivot points 13a and 24a. The wheels may run directly on the ground, or they may be used as guide and drive wheels for tracks 62, which are further guided by pulleys 63 and 64.

As is evident, the position of the chassis in reference to the ground 65 is controlled by the angular positions of levers 6, 22 and 13, 24, which in turn are controlled by hydraulic motors 25, one being provided for each lever. Motors 25 should be visualized as being conventional hydraulic motors of the type widely used in hydraulic servo systems. As is schematically indicated, each motor includes a cylinder, a piston, and a piston rod coupled to the respective lever. The angular positions of the levers are used to control synchros 26. The pivot points of the levers may coincide with the turning axes of the synchros, but also may be separate therefrom.

Figure 4:
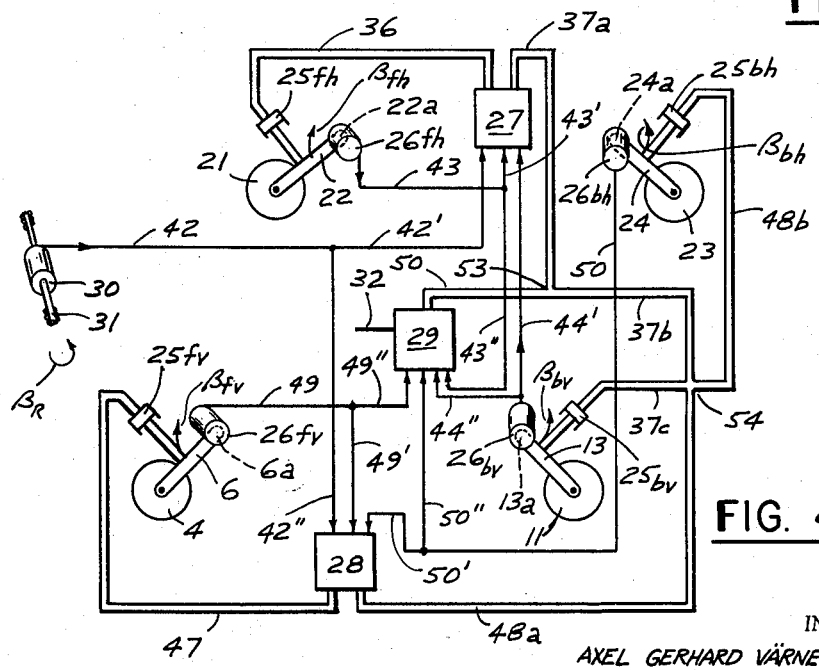
FIG. 4 is a diagrammatic view of the electro-hydraulic servomechanism controlling the position of the chassis according to the invention.

In FIG. 4 and other figures of the drawing, all pipes for the hydraulic fluid are shown with double lines, and all electric conductors of the system are shown with single lines.

Figure 5:
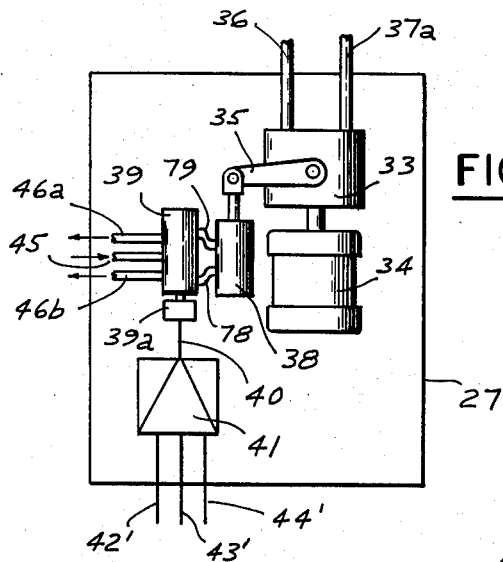
FIG. 5 is a diagrammatic detailed view of one of the control means in the mechanism.

The hydraulic motor $25_{fh}$ which controls the swinging arm 22 supporting the right-hand front wheel 21 is supplied with oil from the electro-hydraulic servo system 27 via the pipe 36. Similarly, the hydraulic motor $25_{fv}$ for the left-hand front wheel 4 is supplied with oil from a second conventional electro-hydraulic servo system 28 via the pipe 47. Pipes 48b and 37c are connected to a hydraulic motor $25_{bh}$ for the right-hand rear wheel 23 and to a hydraulic motor $25_{bv}$ for the left-hand rear wheel 11. The pipes are joined at a junction point 54, to which pipes 48a and 37b are also connected. Pipe 48a leads from junction point 54 to the electro-hydraulic servo system 28, and pipe 37b leads to a junction point 53, where it branches into a pipe 37a leading to the electro-hydraulic servo system 27 and a pipe 50 leading to a third electro-hydraulic servo system 29. System 29 is controlled by a setting member 32 by means of which the height of the chassis above the mean ground level can be varied, as will be more fully described hereinafter. For regulating the inclination of the chassis in relation to the ground surface, a synchro 30 controlled by a control member 31 is provided. As is shown in FIG. 5, the synchro 30 may be in the nature of a potentiometer comprising a resistance wire 56 connected at its ends to a source 57 of D.C. voltage. One intermediate point of the resistance wire is grounded by a conductor 58. The wire is engaged by a slider contact 55 which is connected by a wire 42a to the conductor 42 for a purpose which will be more fully explained hereinafter. The position of slider 55 in respect to resistance wire 56, and hence the potential supplied to conductor 42, are controlled by turning control member 31.

Figure 6:
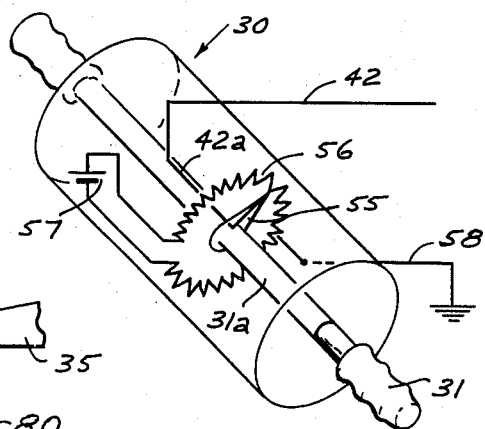
FIG. 6 is a diagrammatic detailed view of another one of the control means in the mechanism.
Figure 7:
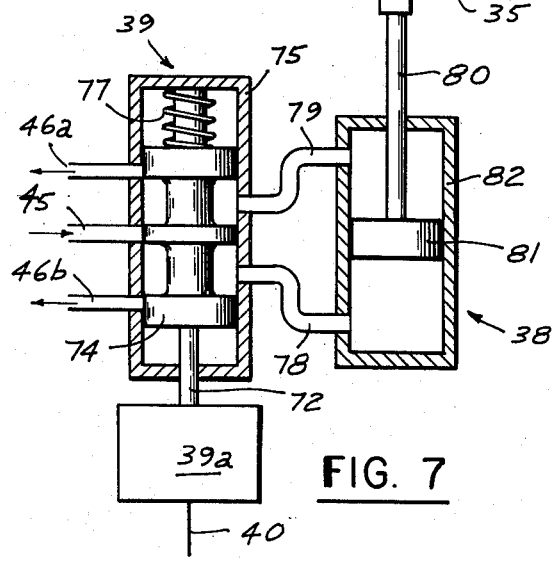
FIG. 7 is a fragmentary sectional view of FIG. 6.

The three electro-hydraulic systems 27, 28 and 29 are electrically connected with the synchros 26 for controlling the angular positions of levers 6, 22, 13 and 24 and the synchro 30 via the conductors as shown in FIG. 4 and described more fully hereinafter. The arrangement of the electro-hydraulic servo system 27 is shown schematically in FIGS. 6 and 7. The system comprises a pump 33 with a variable displacement. The pump 33, which should be visualized as being of a type conventional for servomechanical purposes, is driven by a constant speed motor 34. The direction and quantity of the fluid pumped by pump 33 are regulated by a lever 35. In one predetermined position of lever 35, the pump will not pump at all. If said lever is displaced in a predetermined direction, fluid will be pumped from a pipe 36 to a pipe 37a at a pumping speed directly proportional to the angle of displacement of lever 35. Displacement of lever 35 in the opposite direction causes pumping of fluid from pipe 37a to pipe 36.

The position of lever 35 is controlled by the position of a servo piston 81 to which the lever is connected by a piston rod 80. The piston is slidable in a cylinder 82. The position of the piston in the cylinder, and hence the position of lever 35, are controlled by a pilot valve 39, which is shown in detail in FIG. 7. The pilot valve is connected to cylinder 82 by conduits 78 and 79 to supply pressure fluid to either one or the other side of the piston. The pilot valve in turn is controlled by the position of a piston 74 slidable in a cylinder 75. Cylinder 75, in addition to communicating with pipes 78 and 79, is connected to a fluid inlet pipe 45 and fluid outlet pipes 46a and 46b. These pipes should be visualized as being suitably connected to a source of pressure fluid, such as oil. As is evident, no pressure fluid will be supplied to the servo piston 81 in the illustrated position of piston 74. If piston 74 is moved downwardly, fluid will be supplied through pipe 45 to the space in cylinder 82 above piston 81, and fluid will be discharged from the space below piston 81 through pipe 46b, and vice versa. The position of piston 74 in cylinder 75 is controlled against the action of a spring 77 by a pilot magnet 39a, which is controlled by pilot signals received through an electric conductor 40 connected to an amplifier 41 of conventional design. The amplifier, which preferably includes a stabilizing network, is controlled by signals received through conductors 42', 43' and 44'.

The servo system 28 is similar to the servo system 27. The electro-hydraulic system 29 may also be arranged in generally the same way as the two previously mentioned systems, but in the exemplified system only one outlet pipe 50 is provided, and the other side of the pump is suitably connected to a container for hydraulic fluid. Setting lever 32 corresponds in function to control member 31.

The function of the described electro-hydraulic arrangement will now be described in greater detail, mathematically, with equations for the state of equilibrium desired. All angular displacements are designated $\beta$ and are counted as positive in the direction indicated by arrows in different places in FIG. 4.

The components and values for the left-hand front wheel 4 have been designated with the index $fv$, those for the left-hand rear wheel 11 with the index $bv$, those for the right-hand front wheel 21 with the index $fh$, and those for the right-hand rear wheel 23 with the index $bh$. The setting angle for the synchro 30 is designated by $\beta_R$.

The electro-hydraulic servo system 27 receives signals through the conductors 43 and 43' from the synchro $26_{fh}$ for the right-hand front wheel 21, through the conductor 44' from the synchro $26_{bv}$ for the left-hand rear wheel 11, and through the conductors 42 and 42' from the synchro 30. The servo system 27 through pipe 36 actuates the servo motor $25_{fh}$, which controls the setting of the swinging lever 22 for the right-hand front wheel 21 in such a way that the system seeks to obtain the following state of equilibrium:

$$\beta_R = G_1(\beta_{fh} - \beta_{bv}) \quad (1)$$

where $G_1$ is a system constant.

The electro-hydraulic servo system 28 receives signals through the conductors 49 and 49' from the synchro $26_{fv}$ for the left-hand front wheel 4, through the conductors 50 and 50' from the synchro$_{bh}$ for the right-hand rear wheel 23, and through the conductors 42 and 42'' from the synchro 30. The system seeks to obtain a state of equilibrium according to the equation:

$$\beta_R = G_1(\beta_{fv} - \beta_{bh}) \quad (2)$$

From the Equations 1 and 2 the following equality is obtained:

$$B_R = G_1 \left[ \frac{\beta_{fh} + \beta_{fv}}{2} - \frac{\beta_{bh} + \beta_{bv}}{2} \right]$$

or $$F_1 = G_1 \cdot \alpha \quad (3)$$

where $F_1$ is a function of $\beta_R$, which is related to the dimensions of the vehicle, and in which $\alpha$ is the angle of elevation of the vehicle; that is, its angle in the longitudinal direction in relation to the ground surface. As may be noted from Equation 3, the angle of elevation of the vehicle can be directly controlled by the impulses emitted from the synchro 30, provided the electro-hydraulic systems 27 and 28 seek to achieve the state of equilibrium according to Equations 1 and 2.

The electro-hydraulic servo system 29 receives impulses from the synchros 26 for all four wheels and from the setting member 32. The pump comprised in the servo system 29 is connected to the hydraulic motors $25_{bh}$ and $26_{bv}$ for the two rear wheels 23 and 11, respectively, and also to the pumps in the servo systems 27 and 28. The servo system 29 sets the vehicle at a certain height above the mean ground level in accordance with the following equation:

$$F_2 = G_2 \frac{\beta_{fh} + \beta_{fv} + \beta_{bh} + \beta_{bv}}{4} = F_3 \cdot \text{mean height of vehicle} \quad (4)$$

where $F_2$ is a function of the position of the setting member 32 and $G_2$ a system constant.

$F_2$ can be dependent on $\beta_R$, for instance, in such a way that the height of the vehicle above the ground will be constant.

From the Equations 1 and 2

$$\beta_{fh} - \beta_{fv} = \beta_{bv} - \beta_{bh} \quad (5)$$

is obtained.

Equation 5 shows that in the lateral plane the vehicle assumes an angle nearly equal to the mean value of the angles of inclination of the ground at the front and rear of the vehicle.

The Equations 4 and 5 yield the equations $$F_2 = G_2 \frac{\beta_{bv} + \beta_{fv}}{2} \quad (6)$$

$$F_2 = G_2 \frac{\beta_{bh} + \beta_{fh}}{2} \quad (7)$$

From the Equations 6 and 7 it appears that $F_2$ as a function of $\beta_R$ can be chosen in such a way that the driving tracks on each side of the chassis over the respective wheels are given a substantially constant tension.

The electro-hydraulic arrangement as shown in FIG. 2 has the advantage that as to power, the pumps comprised in the servo systems 27 and 28 need be dimensioned only for differences in pressure between the piston pressures of the hydraulic motors which are connected. Moreover, the pump in the servo system 29 need be dimensioned only for a comparatively small quantity of fluid per unit of time. From Equation 4 it may be noted that any leakage in the system will be automatically compensated for by filling from the container for the hydraulic fluid (not shown) by the pump in the servo system 29.

To describe further the function of the electro-hydraulic arrangement shown in FIG. 4, three different functions which can be obtained with the aid of said arrangement will be considered, even though in practice, the three functions may occur simultaneously. The three functions are as follows:

(A) Compensation for unevenness (either elevation or depression) of the ground.
(B) Setting of the vehicle in its longitudinal direction in angular relation to the ground surface.
(C) Setting of the vehicle at a certain height above the mean ground level.

(A) It is assumed that neither the synchro 30 connected to the control element 31 nor the setting member 32 gives any impulses for changing the setting angles of the wheels. It is also assumed that all four wheels, from the beginning, are resting on an even horizontal base. If now, for instance, the left-hand front wheel 4 of the vehicle passes over a bump in the ground surface, the swinging lever 6 will not be turned instantly, and the entire chassis will be inclined as much as the unevenness lifts the vehicle over the mean ground level. Due to such tilt of the chassis, the two levers 13 and 24 will both swing as the respective two hydraulic motors $25_{bv}$ and $25_{bh}$ are connected to each other via the pipes $37c$ and $48b$ and the junction point 54. The upward movement of the part of the chassis in which the left-hand front wheel 4 is located will thus have the result that the lever 24 will swing upward, that is, the wheel 23 will move closer to the chassis, and at the same time the swinging arm 13 will swing downward, that is, the wheel 11 will move farther away from the chassis. During these two movements of the chassis, oil will pass from the hydraulic motor $25_{bh}$ to the hydraulic motor $25_{bv}$, and at the same time the two synchros $25_{bh}$ and $26_{bv}$ will be correspondingly turned. The synchro $26_{bh}$ will now transmit a signal through the conductors 50, 50' to the electro-hydraulic servo system 28, and as a result, the pump in the servo system 28 will pump oil from the hydraulic motor $25_{fv}$ to the pipe $48a$. Similarly, the synchro $26_{bv}$ will transmit a signal through the conductor 44' to the electro-hydraulic system 27, and this signal will cause the pump in said system 27 to pump oil to the hydraulic motor $25_{fh}$ from the pipe $37a$. Due to these two pumping actions, the chassis will be tilted back to half the angle which it had due to the unevenness of the ground surface. The pumping in the two systems 27 and 28 will not cease until the angles of the four levers 6, 13, 22 and 24 satisfy the Equation 5. The final result will be that the swinging upward of the lever 24 will be followed by the same swinging upward of the lever 6, and the two other levers 13 and 22 will swing to the same extent, but in the opposite direction.

If any of the other three wheels 11, 21 and 23 should be pressed upward by an elevation in the ground surface, a similar sequence of operations will take place.

(B) In this case it is assumed that a signal for an increase of the angle of elevation is received from the synchro 30, due to a turning of the control element 31. This signal is fed via the conductors 42, 42' into the amplifier of the servo system 27 and is compared therein with the difference between the signals received through the conductors 43, 43' and 44' from the synchros $26_{fh}$ and $26_{cv}$, respectively. After this comparison, the amplifier 41 transmits a signal through the conductor 40 to the pilot magnet $39a$, which in turn actuates the pilot valve 39. As a result, oil will circulate through the pipes 45 and $46a$ or $46b$, and the servo piston 81 will turn the lever 35 of the pump. Oil is now pumped from the pipe $37a$ to the pipe 36. At the same time, signals are transmitted from the synchro 30 through the conductors 42, 42'' to the electro-hydraulic servo system 28, and a similar pumping action will take place from the pipe $48a$ to the pipe 47. Due to these two pumping actions of the servo systems 27 and 28, the hydraulic motors $25_{fh}$ and $25_{fv}$ will press the swinging arms 22 and 6 in the direction away from the chassis. At the same time, the two hydraulic motors $25_{bh}$ and $25_{bv}$ will cause the swinging arms 24 and 13 to turn in the direction toward the chassis. This pumping and turning will not cease until the angles of the four swinging arms satisfy the Equation 3 again. In other words, the final result is an increase in the angle of elevation which corresponds to the turning of the control element 31. A corresponding sequence of operations will, of course, take place if a signal for a decrease in the angle of elevation is transmitted from the synchro 30.

(C) The setting of the chassis at a selected height above the mean ground level is effected by movements of the setting element 32. If the setting element 32 is displaced in a direction which corresponds to an increase in the height of the vehicle above the mean ground level, the pump in the electro-hydraulic system 29 will supply oil to the pipe 50, and the two hydraulic motors $25_{bh}$ and $25_{bv}$ will then press down the swinging arms 25 and 13 in the direction away from the chassis until the Equation 4 has been satisfied. Due to such a turning of the swinging arms 24 and 13, the two synchros $26_{bh}$ and $26_{bv}$ will transmit signals through the conductors 50, 50'' and 44'' to the servo system 29 and also to the servo systems 27 and 28 through the conductors 50, 50' and 44'. These signals will produce the result that the pumps in the two servo systems 27 and 28 will supply oil through the pipes 36 and 47 to the hydraulic motors $25_{fh}$ and $25_{fv}$. The pumping in the three systems 27, 28 and 29 will continue until the angles of all four synchros 26 satisfy the Equations 3 and 4. The final result is that the height of the vehicle above the mean ground level will be set to conform to the impulse from the setting member 32.

As may be noted from the foregoing, the chassis according to the invention has the property that its angle of lateral inclination is equal to the mean value of the inclination of the ground laterally of the front wheels and the rear wheels.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A suspension device for a vehicle having two front wheels and two rear wheels, said device comprising in combination, a generally plane chassis, four levers pivotally mounted on said chassis and each rotatably supporting one of said wheels, an electro-hydraulic motor coupled to each of said levers for varying the angular position of the respective lever in reference to the general plane of the chassis, a first, a second and a third electro-hydraulic control means for controlling the flow of pressure fluid to said motors, a first pressure fluid conduit means interconnecting the motors of the two rear wheels with each other, second pressure fluid conduit means connecting the motor for the right front wheel to the first control means, third pressure fluid conduit means connecting the motor for the left front wheel to the second control means, fourth pressure fluid conduit means connecting the first and second control means with each other and the third control means, and control circuit means interconnecting the motors and the control means, each of said motors in response to a change in the angular position of the respective lever generating control signals fed to said control means by said circuit means, said control means in response to said signals varying the flow of pressure fluid to said motors so that said levers occupy angular positions at which the general plane of the chassis is substantially level in reference to a support surface for the chassis.

2. A suspension device according to claim 1 and comprising an electric tilt control means connected by said control circuit means to said first and second control means, said tilt control means when operated generating control signals independent of the control signals generated by said motors, said independent control signals controlling the angular positions of said levers so that the general plane of the chassis occupies a selected position of tilt in reference to a support surface for the chassis.

3. A suspension device according to claim 1 and comprising a height control means connected to said third electro-hydraulic control means, said height control means when operated controlling said third control means so that the same adjusts the flow of pressure fluid to the motors to a flow at which the general plane of the chassis occupies a selected position of height in reference to a support surface for the chassis.

References Cited by the Examiner
UNITED STATES PATENTS

| | | | |
|---|---|---|---|
| 1,836,446 | 12/31 | Christie | 305—27 X |
| 2,845,280 | 7/58 | Krotz | 280—104 |
| 3,029,089 | 4/62 | Nashman. | |
| 3,035,853 | 5/62 | Klein. | |
| 3,124,368 | 3/64 | Carley. | |

A. HARRY LEVY, *Primary Examiner.*

LEO FRIAGLIA, *Examiner.*